United States Patent [19]

Harada et al.

[11] Patent Number: 4,912,835
[45] Date of Patent: Apr. 3, 1990

[54] CERMET SPRAYED COATING ROLL WITH SELECTED POROSITY AND SURFACE ROUGHNESS

[75] Inventors: Yoshio Harada; Kazumi Tani, both of Hyogo, Japan

[73] Assignee: Tocalo Co., Ltd., Kobe, Japan

[21] Appl. No.: 249,829

[22] Filed: Sep. 27, 1988

[30] Foreign Application Priority Data

Sep. 30, 1987 [JP] Japan .............................. 62-243616

[51] Int. Cl.⁴ .......................... B21B 27/02; B05D 1/10
[52] U.S. Cl. ........................................ 29/132; 29/110; 427/423; 427/427
[58] Field of Search ................ 29/110, 132, 148.4 D, 29/129.5; 427/34, 190, 191, 423, 427, 383.9, 383.7

[56] References Cited

U.S. PATENT DOCUMENTS

| | | | |
|---|---|---|---|
| 4,478,871 | 10/1984 | Sakaguchi et al. | 427/34 |
| 4,491,082 | 1/1985 | Barch et al. | 29/129.5 X |
| 4,521,184 | 6/1985 | Samuel et al. | 29/132 X |
| 4,588,608 | 5/1986 | Jackson et al. | 427/423 X |
| 4,588,655 | 5/1986 | Kushner | 427/423 X |
| 4,600,599 | 7/1986 | Wallsten | 427/423 X |
| 4,666,733 | 5/1987 | Wlodek | 427/423 X |
| 4,678,717 | 7/1987 | Nickola et al. | 427/383.9 X |
| 4,701,356 | 10/1987 | Bose et al. | 427/423 |
| 4,731,253 | 3/1988 | DuBois | 427/423 X |
| 4,771,524 | 9/1988 | Barbezat et al. | 29/132 |
| 4,787,837 | 11/1988 | Bell | 264/284 X |

FOREIGN PATENT DOCUMENTS 2169381 7/1986 United Kingdom ................ 29/132

Primary Examiner—Timothy V. Eley
Assistant Examiner—Peter D. B. Vo
Attorney, Agent, or Firm—Balogh, Osann, Kramer, Dvorak, Genova & Traub

[57] ABSTRACT

A roll for use in rolling process is disclosed. The roll is provided with a sprayed coating of cermet in such a way that a porosity of the sprayed coating of for example a compound of tungsten carbide and cobalt and nickel-chromium cermet is selected less than 1.8% and a surface roughness Rmax of the sprayed coating is selected less than 3.0 μm.

5 Claims, 3 Drawing Sheets

FIG_1
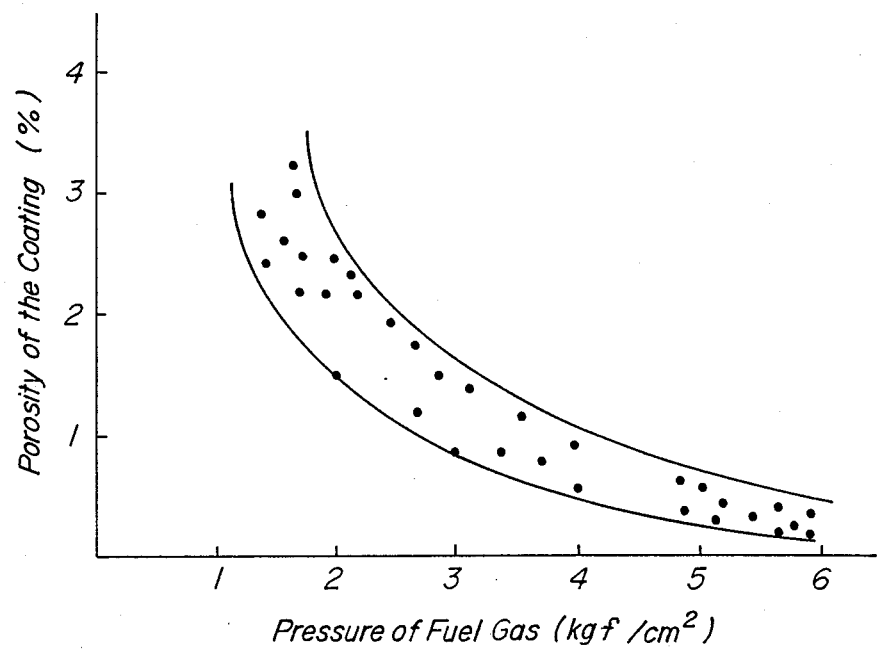

FIG_2
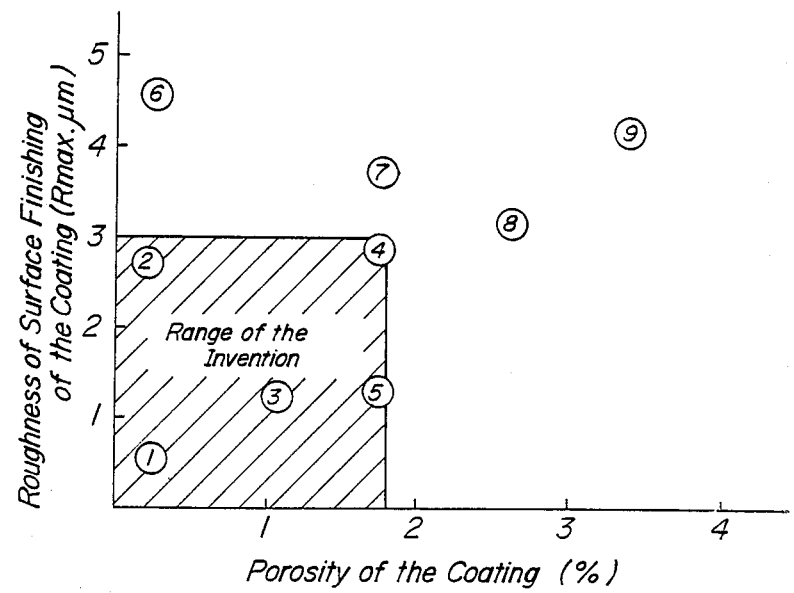

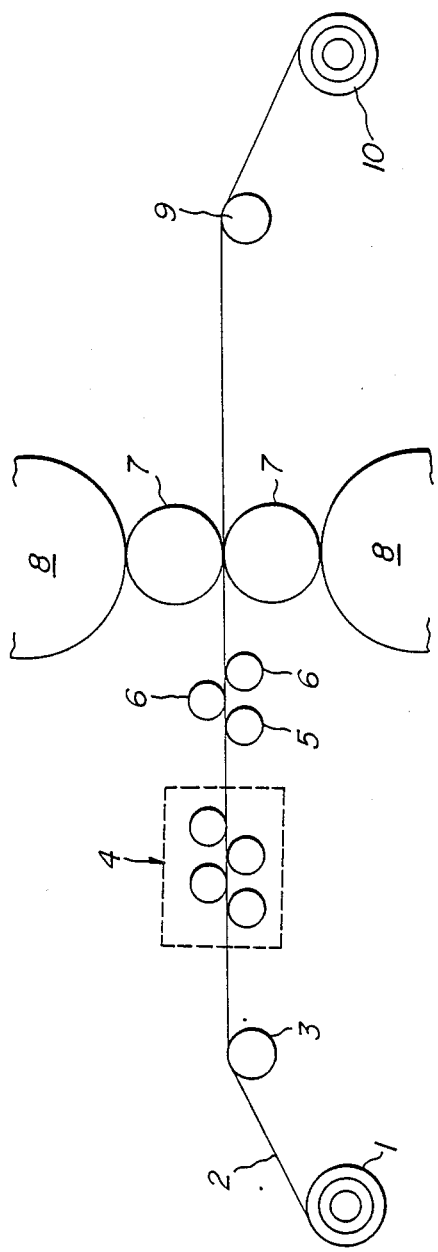
FIG._3

CERMET SPRAYED COATING ROLL WITH SELECTED POROSITY AND SURFACE ROUGHNESS

BACKGROUND OF THE INVENTION

The present invention relates to a roll for use in a rolling process of non-ferrous metal as in case of producing a sheet of aluminum, copper, titanium, nickel and an alloy thereof.

When a sheet of non-ferrous metal is produced, for example, a sheet of aluminum (hereinafter referred to as "Al"), first of all, an ingot heated to 480°~520° C. is prepared, and this ingot is subjected to a hot rolling process at a temperature range of 180°~320° C. to produce a sheet. The sheet thus obtained by the hot rolling treatment is subjected to a cold rolling treatment to make its thickness a predetermined value, and then, it is cut to a required length in accordance with the aim and is subjected to a heat treatment. Then it is subjected to a chemical treatment, thereby obtaining a manufacturing product.

On the production line of the above Al sheet, the hot rolling and cold rolling processes are indispensable, so that various rolls are utilized in accordance with a working aim in these processes. These rolls used in accordance with the application have to possess the following attributes.

(1) Proper coefficient of friction should be shown for sheets (Al sheet). That is, (a) A preset tension can be given. (b) Slipping of sheets does not occur. (c) Preventing the meandering of the sheets.
(2) Surface inperfections such as scratches and dents must not occur.
(3) Fats and oils or the like, metal and nonferrous metal dusts should be avoided.
(4) The above performances can be held for a long term.

Hitherto, to achieve the foregoing, the roll was electroplated with coatings of chromium (chromium plating).

The above chromium plated roll has very excellent characteristics in the point that the surface inperfections do not apply blemishes to sheets, but the following problems exist.

(1) In the elevated temperature (300° C. or more), the chromium plated layer loses its hardness, thereby decreasing abrasion resistance thereof extremely.
(2) When the chromium plated layer is used at the temperature of 220°~250° C. for 1,500 hours, micro cracks present in the chromium plate become progressively large, so that surface imperfections are applied to the sheets, or the oxide coating of Al or particles of metal Al adhere to the micro cracks, resulting in an unsatisfactory operation of the roll.
(3) During the cold rolling process, the rolls undergo a slip phemomenona, frequently so that with a frictional heat caused at that time. Al dust of the sheet adheres onto the surface of the chromium plated layer of the roll, resulting in a generation of the surface inperfections on the sheets.
(4) As a countermeasure to the adhesion of Al dust or the like to the rolls as described above, the rolls are frequently treated to remove the adhered Al dust or the like with the use of abrasive papers. Such a maintenance for the countermeasures must be carried out frequently, so that it will require a great deal of labor. Moreover, during such a maintenance with the abrasive papers, the chromium plated surface of the rolls is susceptible of imperfection, so that there is a tendency for Al dust or the like to adhere at future time.

As described above, the foregoing problems decrease productivity of Al product line, deteriorate quality of the sheets, and decrease the lifetime of the rolls.

SUMMARY OF THE INVENTION

The present invention has for its object to provide a roll for use in rolling process capable of overcoming the above problems to be solved with the current chromium plated rolls.

The present invention provides a roll for use in rolling process is characterized in that a porosity of a sprayed coating of cermet is selected less than 1.8% and a surface roughness Rmax of the sprayed coating is selected less than 3.0 $\mu$m. The sprayed coating of cermet is made of a sprayed carbide cermet consisting of a compound of tungsten carbide and cobalt or nickel-chromium alloy. The sprayed coating of cermet is made of a compound of 88 weight % of tungsten carbide and 12 weight % of cobalt. The sprayed coating of cermet is made of a compound of 73 weight % of tungsten carbide, 20 weight % of chromium and 7 weight % of nickel.

According to the present invention, sprayed coating of a cermet of tungsten carbide (hereinafter, referred to as "WC") sprayed onto a roll surface, has a hardness higher than that of chromium plated layer (Hv800~930), for example, an order of Hv1100~1300, and is excellent in abrasion resistance. The surface of the sprayed coating of cermet exhibits a condition that in view of macro-observation, WC fine particles each having an acute angle are aligned together in large numbers. Therefore, the sprayed coating of cermet is preferable for a roll for use in rolling process in the point of characteristics that it has a high coefficient of friction, applies a high tension to the sheets, and does not slip.

This sprayed coating of cermet has characteristics that it is liable to make scratches and dents onto the surface of sheets and that metal or nonferrous metal dusts or the like are susceptible of adhesion. The sprayed coating of cermet, also is a mixture of WC particles of high hardness and metals, so that a coating made by plasma spraying the mixture has a metal structure that metal particles are enclosed around WC particles. The WC particles, however, are hard and do not perform a plastic deformation so that particles themselves are destroyed by the collision during spraying and the collision energy makes cracks onto the pre-formed coating so that voids tend to form in the sprayed coating of cermet. If such a sprayed coating having voids therein is polished, these voids are exposed thereby forming pits in the mirror finished surface, so that such a mirror surface becomes inappropriate for use in rolling process.

Considering such a view point, the sprayed coating for use in rolling process according to the present invention, must be mirror-finished finally, so that even if the sprayed coating has a high density (porosity is low) and a large number of voids therein, an indispensable condition is that the voids be fine or microscopic. If the surface of the sprayed coating rolls is too mirror-finished, its frictional coefficient required a roll becomes decreased. Moreover, a mirro-finish requires a great deal of labor and is expensive.

It is important that the sprayed coating is formed by taking these problems into account and a proper surface finishing is selected.

BRIEF DESCRIPTION OF THE DRAWINGS

FIG. 1 is a graph showing a relation between a pressure of fuel gas for spraying heat source supplied to a spraying gun and porosity of the coating formed by the fuel gas;

FIG. 2 is a graph showing a relation between a porosity of WC cermet sprayed coating and roughness of surface finishing of the coating; and FIG. 3 is a diagram showing Al sheet rollingline used in the present embodiment.

DETAILED DESCRIPTION OF THE PREFERRED EMBODIMENT

The present inventors have studied spraying conditions to obtain a fine sprayed coating and paid attention to following means, i.e., (1) softening of the sprayed particles due to increase of atmospheric temperature and (2) increase of collision energy to the surface of a body to be sprayed. However, according to the means (1), high hardness as a carbide can not be utilized since WC is changed in quality to lower carbide or intermetallic compound or an oxide due to high temperature. The present inventors, therefore, have studied the means (2) again.

In concrete, the jet speed of combustion gas is made high and the collision energy of spraying particles is made high by using oxygen-hydrogen gas or oxygen-hydrocarbon gas as a heat source and by increasing the pressure supplied to a spraying gun. In this case, the supplying pressure of fuel gas is made as a changing factor, so that the higher the supplying pressure becomes, the faster the jet speed of combustion gas becomes. As a result of this, the reduction of the porosity of the sprayed coating is aimed at. FIG. 1 shows a relation between a pressure of oxygen-hydrogen gas supplied to a spraying gun and the porosity of sprayed coating. As shown in FIG. 1, it is found that for the sprayed coating, the higher the supplying pressure of fuel gas becomes, the lower the porosity becomes.

Then, by using the rolls with WC cermet sprayed coating having various porosity, the rolling process of non-ferrous metal (Al and alloys thereof, Cu and alloys thereof) is carried out and its operating mechanism is observed. A summary of the results is shown below.

(1) WC cermet sprayed coating is very hard, so that even though this coating is used with a mirror finish, the non-ferrous metal plate (sheet) does not undergo surface imperfections and the mirror finished sheet did not slipped, since it seemed that a proper frictional force is generated between the sheet and the WC cermet sprayed coating because of the coating being a mixture of ceramics and the metal.

(2) According to such a rolls, the slip phenomena does not occur and scratches or local dents are not applied to the sheets, so that the pick up of the sheet metal does not occur in accordance with the slip phenomenon, and thus the roll surface may always be held in a prime condition, resulting in an operation over a long period of time.

(3) Even if the sheet metal adheres to the roll surface, it does not react to WC cermet sprayed coating and can easily be removed, so that the roll surface is not subjected to imperfection.

(4) However, since for WC cermet sprayed coating having high porosity, even though the coating is subjected to mirror finishing, a large number of pits appear on the coating surface due to voids, so that mirror finished surface can not be obtained and thus the coating can not exhibit sufficiently a function as a roll for use in rolling process aimed by the present invention. On the whole even though porosity of WC cermet sprayed coating is low, when surface roughness is low the soft sheet is susceptible to of imperfection, resulting in a decrease of value in a product. After all, the present invention determines a compatibility of both means which is very important as a roll for use in rolling process.

FIG. 2 shows a relation between porosity of WC cermet sprayed coating and surface roughness Rmax thereof. As shown in FIG. 2, it is found that the coating having a low porosity can be mirror-finished, and then the coating having the porosity of less than Rmax 0.1 $\mu$m can also be mirror-finished. However, the sprayed coating having a high porosity can not be mirror-finished, since the inherent voids appear on the surface.

The polishing work is fully performed by using synthetic diamond wheels and a paste, and the surface roughness is measured by an instrument for the measurement of surface roughness by the stylus method. The number of porosity of sprayed coating is obtained by taking a photograph in which a cross section of the sprayed coating is magnified about 500 times with a microscope, by staining the void portions, and by obtaining the stained areas with an image analyzer. The surface roughness is fully unified by maximum height Rmax. As a sign indicating the surface roughness, generally, there are three ways, Ra, Rz and Rmax. Even though Ra showing an arithmetical mean deviation of the roughness curve and Rz showing ten point height are small, that is, a roll surface having small mean roughness is obtained, if the surface having large roughness exists at one portion, this large roughness portion makes scratches and dents on the sheet surface. The present invention attaches importance to Rmax and uses this maximum height.

The reasons that the porosity is limited to less than 1.8%, and the surface roughness Rmax of the coating is limited to less than 3.0 $\mu$m are explained hereinafter.

To this end, the following tests are carried out. An Al sheet of 600 mm in width$\times$2.5 mm in thickness (JIS H4000 1050) and Al alloy sheet of same dimension (JIS H4000 3005) were prepared. These sheets were subjected to cold rolling process to achieve a thickness of 1.0 mm with the use of rolls having WC cermet sprayed coatings with various values of adjusted porosity and surface roughness. The situation of imperfections caused on the sheet surface were then investigated.

(1) Composition of WC cermet spraying materials;
  ① WC (88 wt%)-Co (12 wt%)
  ② WC (73 wt%)-Cr (20 wt%)-Ni (7 wt%)

(2) Relation between the porosity and the surface finish of the sprayed coating;

Rolls with WC cermet sprayed coating of 100 $\mu$m thickness and having the porosity and the finished roughness as shown in Table 1 were produced.

By combining the above conditions, the surface situation of the sheets subjected to cold rolling process was observed, and the result thereof is shown in Table 1. From these results the following facts were found.

That the coating having a low porosity and small surface roughness does not cause imperfections on the sheets at all, but the coating having low porosity and a large surface roughness causes scratches on the sheets. The coating having high porosity has its surface roughness with Rmax of more than 3.2 μm, since the surface roughness can not be made small. The rolls having such a coating cause scratches on the sheet passing therethrough. These two kinds of WC cermet spraying materials have the same performance, if the sprayed coatings are formed so as to satisfy the above conditions.

From the above results, it was found that WC cermet sprayed coatings provided on the surface of rolls for use in rolling process according to the present invention should have a porosity of less than 1.8% and a surface roughness Rmax of less then 3.0 μm. FIG. 2 shows such a condition by a hatched area to indicate a range of the present invention.

TABLE 1

| Number | Porosity of cermet sprayed coating (%) | Surface roughness (Rmax · μm) | Scratch on Sheet |
| --- | --- | --- | --- |
| 1 | 0.25 | 0.5 | absence |
| 2 | 0.23 | 2.8 | " |
| 3 | 1.11 | 1.2 | " |
| 4 | 1.80 | 3.0 | " |
| 5 | 1.80 | 1.3 | " |
| 6 | 0.25 | 4.5 | presence |
| 7 | 1.80 | 3.7 | " |
| 8 | 2.70 | 3.2 | " |
| 9 | 3.40 | 4.2 | " |

EXAMPLE-1

In this example, an Al sheet (JIS H4000 1050) of 500 mm in width × 30 mm in thickness was heated to 300° C. These sheets are subjected to a hot rolling process. After the rolling process, the surface situation of Al sheets was observed as well as the situation of Al component adhered to the roll surface and the change in hardness of the coating were investigated.

A WC cermet sprayed coating, according to the present invention, had a composition of ① WC (88 wt%)-Co (12 wt%), and as an example to be compared, a general purpose chromium plated roll was used.

Table 2 shows the result of the above example. As shown in Table 2, it was found that the rolls having WC cermet sprayed coating according to the present invention do not cause scrathes on the sheets even in hot rolling process, Al components did not adhere to the rolls, and the hardness of sprayed coating after 5 hour running was not changed and remained the same as that of sprayed coating before the rolling process. On the contrary, it was found that a plurality of Al components adhered to the above chromium plated rolls and the hardness of the coating becomes decreased largely, so that the desirable function of the roll decreased.

TABLE 2

| Classification | Sort | No. | Porosity of cermet sprayed coating (%) | Surface roughness (Rmax.μm) | Hardness of cermet Sprayed coating (Hv) Pre-rolling | Hardness of cermet Sprayed coating (Hv) Post-rolling | adhesion to sheet |
| --- | --- | --- | --- | --- | --- | --- | --- |
| Present invention | WC cermet spraying | 1 | 0.25 | 0.5 | 1120 | 1120 | absence |
| | | 2 | 0.23 | 2.8 | 1150 | 1150 | " |
| | | 3 | 1.11 | 1.2 | 1160 | 1160 | " |
| | | 4 | 1.80 | 3.0 | 1150 | 1160 | " |
| | | 5 | 1.80 | 1.3 | 1140 | 1140 | " |
| Example to be compared | chromium plating | 6 | 0.1 or less | 0.1 | 880 | 350 | Strong adhesion |
| | | 7 | 0.1 or less | 0.3 | 850 | 360 | Strong adhesion |
| | | 8 | 0.1 or less | 0.5 | 890 | 370 | Strong adhesion |

(Remarks) Hardness of cermet sprayed coating and chromium plating were measured by using micro-Vickers hardness measuring device at 5 points and its average value is shown.

EXAMPLE-2

A long running field test of the rolls having WC cermet sprayed coating according to the present invention was carried out by using a running Al sheet rolling line. FIG. 3 shows an out line of rolling installation used in this Example-2. An Al sheet 2 wound on a coil 1 is driven by bridle rolls 4 over a deflector roll 3 and the angle of the sheets moving over work rolls 7 is adjusted by moving and ajusting rolls 6 up and down after passing through a reference roll 5. The pressure of work rolls 7 on the Al sheet 2 can be adjusted by back-up rolls 8. The Al sheet 2 which is rolled to a given thickness, is again taken up on a coil 10 by a deflector roll 9.

Various rolls in the above rolling line are subjected to a WC cermet spraying process and a surface roughness finishing process and subjected to a cold rolling process for 6 months to investigate durability over a long period of time. As a roll to be compared, bridle rolls were subjected to a chromium plating working.

Table 3 shows the results of the above Example-2. As shown in Table 3, it was found that Al components adhered onto the rolls having WC cermet sprayed coating according to the present invention, even though Al components adhered onto the rolls. The removal thereof was easy, and the coatings have retained normal conditions even after 6 months. On the contrary, a plurality of Al components adhered onto the chromium plated rolls of the example to be compared after one month, and it is difficult to remove these Al components from the rolls. In this case, when these Al components are removed by abrasive papers, a plurality of scratches were created onto the plated surface of rolls, so that if these rolls were reused, more of Al components adhered onto the roll surface and then the adhered Al components caused dents onto Al sheets. As a result of this, the condition of the roll deteriorated greatly.

In this Example-2, Al sheets (JIS H4000 1050) of 1200 mm in width × 1.6 mm in thickness were used and these sheets were subjected to cold rolling process to achieve a thickness 0.6 mm.

TABLE 3

| Classification | Sort | Roll type | Porosity of cermet sprayed coating (%) | Surface roughness (Rmax-μm) | After 1 month | After 2 months | After 3 months | After 4 months |
|---|---|---|---|---|---|---|---|---|
| Present invention | WC Carbide spraying | Bridle | 0.25 | 0.5 | O | O | O | Δ |
| | | | 0.23 | 2.8 | O | O | O | Δ |
| | | Reference | 0.25 | 0.5 | O | O | O | O |
| | | Coloring | 1.80 | 3.0 | O | O | O | Δ |
| | | | 1.80 | 1.3 | O | O | O | O |
| | | Work | 1.11 | 0.5 | O | O | Δ | Δ |
| | | | 1.11 | 0.5 | O | O | O | Δ |
| Example to be compared | Chromium plating | Bridle | 0.1 or less | 0.1 | ▲ | X | | |
| | | | 0.1 or less | 0.3 | ▲ | X | | |

(Remarks)
O Although Al components are more or less adhered, removal thereof was easy and the coating was sound.
Δ Although more Al components adhered, removal thereof was easy and the coating was sound.
▲ Many of Al components adhered and removal thereof was hard as well as imperfections took place on the coating.
X Removal of Al component was difficult and a part of the coating peeled off.

EXAMPLE-3

In this Example-3, Cu sheets (JIS H3100 C1020P) of 600 mm in width × 2.5 mm in thickness and Cualloy sheets (JIS H3100 C2680P) having the same dimension of Cu sheet were prepared. These sheets were subjected to cold rolling process to achieve a thickness 1.0 mm with the use of rolls having WC cermet sprayed coating with various values of adjusted porosity and surface roughness. The situation of scratches caused onto the sheet surface were investigated.

Composition of the spraying materials were:
① WC (88 wt%)-Co(12 wt%) and
② WC (73 wt%)-Cr(20 wt%)-Ni(7 wt%).

The thickness of the sprayed coating was 100 μm.

In this Example, it was found that the rolls for use in rolling process according to the present invention do not cause scratches and dents onto the Cu sheets and Cu alloy sheets during a cold rolling process as in the Al sheet and Al alloy sheet, so that excellent roll function can be achieved.

From the above result, the rolls having WC cermet sprayed coating according to the present invention can be utilized as a roll for use in a rolling process of non-ferrous metal, such as Al sheet and an alloy sheet thereof, Cu sheet and an alloy sheet thereof, Ti sheet and an alloy sheet thereof, and Ni sheet and an alloy sheet thereof.

As described above, using a roll in which the surface of WC cermet sprayed coating has a porosity of less than 1.8% and is then finished as a mirror surface having roughness Rmax of less than 3.0 μm, is used in rolling Al sheet and an alloy sheet thereof as well as Cu sheet and an alloy sheet thereof. Such roll will not inflict scratches and dents on these sheets, and thus sheet components do not hardly adhere onto the roll surface. Even if the sheet components adhere onto the roll surface, these components can easily be removed. Since the coating sprayed onto the rolls has a high degree of hardness, the performance of the roll last over a long period of time.

While the invention has been particularly shown and described herein with reference to a preferred embodiment thereof, it will be understood by those skilled in the art that various other modifications and changes may be made to the present invention from the principles of the invention as herein described without departing from the spirit and scope as encompassed in the accompanying claims.

What is claimed is:

1. A roll for use in a rolling process of non-ferrous metals, comprising a roll body having a surface covered with a sprayed coating of cermet, said sprayed coating of cermet having a porosity of less than 1.8% and having a sprayed coating surface roughness Rmax of less than 3.0 μm.

2. A roll for use in rolling process as claimed in claim 1, wherein the sprayed coating of cermet is made of a sprayed carbide cermet consisting of a compound of tungsten carbide and cobalt and nickel-chromium alloy.

3. A roll for use in rolling process as claimed in claim 1, wherein the sprayed coating of cermet is made of a compound of 88 weight % of tungsten carbide and 12 weight % of cobalt.

4. A roll for use in rolling process as claimed in claim 1, wherein the sprayed coating of cermet is made of a compound of 73 weight % of tungsten carbide, 20 weight % of chromium and 7 weight % of nickel.

5. A roll for use in a rolling process as claimed in claim 1, wherein the sprayed coating of cermet is made of a sprayed carbide cermet consisting of a compound of tungsten carbide and cobalt.

* * * * *